US011260925B2

(12) United States Patent
Sturgeon et al.

(10) Patent No.: US 11,260,925 B2
(45) Date of Patent: Mar. 1, 2022

(54) FOOTREST

(71) Applicant: RADIO FLYER INC., Chicago, IL (US)

(72) Inventors: Samantha Sturgeon, Chicago, IL (US); Garrett DeBry, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 147 days.

(21) Appl. No.: 16/567,592

(22) Filed: Sep. 11, 2019

(65) Prior Publication Data

US 2020/0086940 A1 Mar. 19, 2020

Related U.S. Application Data

(60) Provisional application No. 62/731,502, filed on Sep. 14, 2018.

(51) Int. Cl.
B62J 25/00 (2020.01)
B62K 9/02 (2006.01)

(52) U.S. Cl.
CPC .................. *B62J 25/00* (2013.01); *B62K 9/02* (2013.01)

(58) Field of Classification Search
CPC . B62J 25/00; B62K 9/02; B62K 13/04; B62B 7/044
See application file for complete search history.

(56) References Cited

U.S. PATENT DOCUMENTS

| 3,605,929 | A | 9/1971 | Rolland |
| 4,159,752 | A | 7/1979 | Kanno |
| 4,325,565 | A | 4/1982 | Winchell |
| 4,451,057 | A | 5/1984 | Lawson |
| D301,439 | S | 6/1989 | Glasgow |
| 5,028,066 | A | 7/1991 | Garth |
| 5,190,306 | A | 3/1993 | Nauman et al. |
| D347,809 | S | 6/1994 | Choi |
| D351,125 | S | 10/1994 | Chen |
| D399,270 | S | 10/1998 | Harrod |
| 6,089,587 | A | 7/2000 | Li |
| 6,161,847 | A | 12/2000 | Howell et al. |
| 6,161,860 | A | 12/2000 | Corneau |

(Continued)

FOREIGN PATENT DOCUMENTS

| CN | 205186410 | 4/2016 |
| CN | 103754251 | 9/2016 |

(Continued)

OTHER PUBLICATIONS

Huffy 3-2-1 Tricycle, Amazon.com, as early as Aug. 2014, 4 pages.

(Continued)

*Primary Examiner* — Tony H Winner
(74) *Attorney, Agent, or Firm* — Barnes & Thornburg LLP

(57) ABSTRACT

A footrest is provided for a child riding on a tricycle. The footrest has a housing having a foot platform and a retaining assembly. The foot platform has a top surface and a bottom surface, wherein the top surface is adapted to receive a foot of the user. The retaining assembly is adapted to separately engage one of a fork of the tricycle, a fender for the front wheel of the tricycle, and a crank of the tricycle. Additionally, the footrest does not engage the tricycle body extending between the front fork and the rear wheels of the tricycle.

20 Claims, 6 Drawing Sheets

(56) References Cited

U.S. PATENT DOCUMENTS

| | | |
|---|---|---|
| D437,007 S | 1/2001 | Lerch |
| D440,260 S | 4/2001 | Lenihan |
| 6,270,106 B1 | 8/2001 | Maki et al. |
| 6,443,469 B1 | 9/2002 | Cross |
| 6,685,207 B1 | 2/2004 | Blake |
| 6,726,233 B1 | 4/2004 | Li |
| 6,793,231 B2 | 9/2004 | Wu |
| 6,869,124 B2 | 3/2005 | Kanie |
| 6,874,802 B2 | 4/2005 | Gunter et al. |
| D535,218 S | 1/2007 | Yan |
| 7,281,725 B1 | 10/2007 | Gunter et al. |
| D571,866 S | 6/2008 | On |
| 7,527,276 B2 | 5/2009 | Schmautz |
| D594,788 S | 6/2009 | Hartlaub et al. |
| D604,777 S | 11/2009 | On |
| 7,637,338 B2 | 12/2009 | Maltais et al. |
| D627,265 S | 11/2010 | On |
| 8,109,556 B2 | 2/2012 | Bergman et al. |
| 8,454,045 B2 | 6/2013 | Kettler |
| D687,741 S | 8/2013 | Zhang |
| 8,764,041 B1 | 7/2014 | Baron |
| 8,820,766 B2 | 9/2014 | Kettler |
| D714,693 S | 10/2014 | Bartels |
| D730,248 S | 5/2015 | Baron |
| D735,090 S | 7/2015 | Baron |
| 9,193,408 B2 | 11/2015 | Kettler |
| 9,452,804 B2 | 9/2016 | Neerman |
| D894,064 S * | 8/2020 | Sturgeon ................ D12/174 |
| 2003/0201621 A1 | 10/2003 | Jang |
| 2009/0156094 A1 | 6/2009 | Seckel |
| 2013/0038030 A1* | 2/2013 | Baron ................ B62M 1/38 280/7.17 |
| 2016/0023707 A1 | 9/2016 | Neerman |
| 2019/0092366 A1* | 3/2019 | DeBry ................ B62B 7/08 |

FOREIGN PATENT DOCUMENTS

| | | | |
|---|---|---|---|
| DE | 20 2010009012 | * 11/2010 | ............... B62K 9/02 |
| DE | 202010009012 | 2/2012 | |
| JP | H10119860 | 8/1998 | |
| JP | 3110828 | 4/2005 | |
| JP | 3110828 | 6/2005 | |
| JP | 3160614 | 4/2010 | |
| JP | 5100458 | 12/2012 | |
| JP | 2014088076 | 8/2016 | |

OTHER PUBLICATIONS

Lil' Rider 2-in-1 Stroller Tricycle, Amazon.com, as early as Aug. 2016, 2 pages.

Ides Ides Speaking Cargo Basic Tricycle, Aprica-Japan.com, as early as Aug. 2016, 4 pages.

Ides Sunshade Cargo Plus Tricycle, Aprica-Japan.com, as early as Aug. 2016, 4 pages.

Kiddi-O 6-in-1 Multi-Trike, kettlerusa.com, as early as Aug. 2016, 1 page.

Lil-Foote Kettrest, kettlerusa.com, as early as Aug. 2016, 1 page.

Perfect Fit 4-in-1 Trike, littletikes.com, as early as Aug. 2016, 3 pages.

SmarTrike Recliner 5 in 1 Trike, smartrike.com, as early as Aug. 2016, 3 pages.

European Search Report issued in App. No. 19197174.6-1009 dated Jan. 31, 2020 (13 pages).

Puky Gmbh & Co. Kg: "Bedienungsanleitung CAT-Dreirad" dated Jul. 31, 2016 (64 pages).

Office Action issued in Chinese App. No. 201910871056.7 dated Dec. 20, 2021 (10 pages).

* cited by examiner

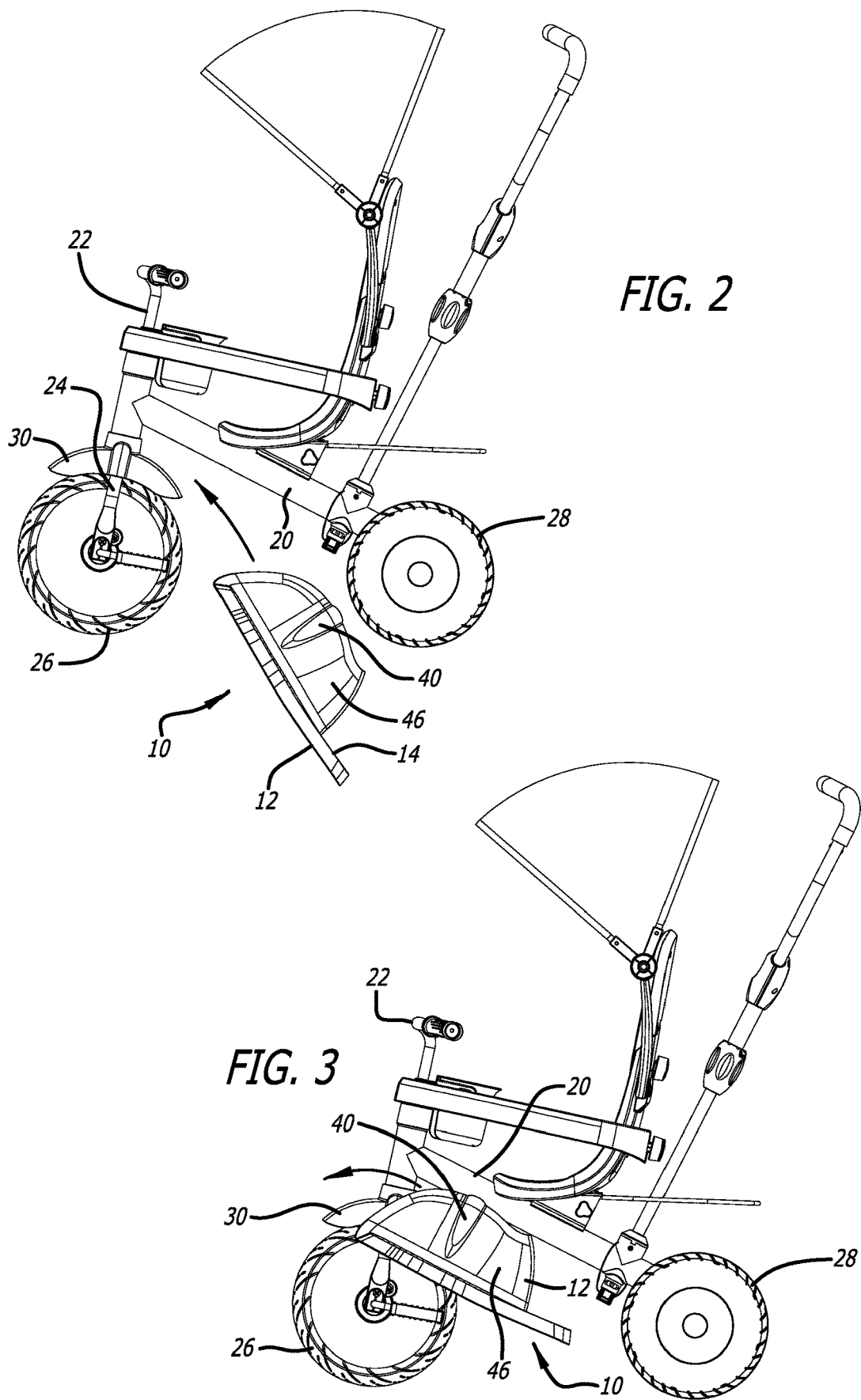

FOOTREST

CROSS-REFERENCE TO RELATED APPLICATIONS

This application claims the benefit of U.S. Provisional Patent Application No. 62/731,502, filed Sep. 14, 2018, which is expressly incorporated herein by reference and made a part hereof.

FEDERALLY SPONSORED RESEARCH OR DEVELOPMENT

Not Applicable.

TECHNICAL FIELD

The present disclosure generally relates to a footrest, and in particular, the disclosure is directed to a footrest for a tricycle.

BACKGROUND

Footrests are well known in the art. While such footrests according to the prior art provide a number of advantages, they nevertheless have certain limitations. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology generally relates to a footrest for a tricycle.

The disclosed subject technology further relates to a footrest for a tricycle, comprising: a housing having a foot platform having a top surface and a bottom surface, the top surface adapted to receive a foot of the user, the foot platform having a U-shaped configuration with an opening to receive a front wheel of the tricycle, a raised sidewall extending from the foot platform, the raised sidewall extending around a portion of a perimeter of the opening in a U-shaped configuration, the raised sidewall having an inner surface and an outer surface, and a retaining assembly, wherein the retaining assembly is adapted to be separately secured to a lower portion of a fork of the tricycle, a crank of the tricycle, and one of a fender for the front wheel of the tricycle and an upper portion of the fork.

The disclosed subject technology further relates to a footrest for a tricycle, the tricycle having a fork rotatably securing a front wheel, a tricycle body extending distal the fork, and a pair of rear wheels rotatably connected to the tricycle body, the footrest comprising: a housing having a foot platform and a retaining assembly, the foot platform having a top surface and a bottom surface, the top surface adapted to receive a foot of the user, wherein the retaining assembly is adapted to separately engage at least two of (a) a lower portion of the fork of the tricycle, (b) a fender for the front wheel of the tricycle or an upper portion of the fork of the tricycle, and (c) a crank of the tricycle.

The disclosed subject technology further relates to a footrest for a tricycle, the tricycle having a fork rotatably securing a front wheel, a tricycle body extending distal the fork, and a pair of rear wheels rotatably connected to the tricycle body, the footrest comprising: a housing having a foot platform and a retaining assembly, the foot platform having a top surface and a bottom surface, the top surface adapted to receive a foot of the user, wherein the retaining assembly is adapted to separately engage one of the fork of the tricycle, a fender for the front wheel of the tricycle, and a crank of the tricycle, and wherein the footrest does not engage the tricycle body.

The disclosed subject technology further relates to a footrest for a tricycle, wherein the footrest does not engage the tricycle body.

The disclosed subject technology further relates to a footrest for a tricycle having a retaining assembly, wherein the retaining assembly comprises a connection member for engaging the fender or the upper portion of the fork, a fork receiver for engaging the lower portion of the fork, and a crank receiver for engaging the crank, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

The disclosed subject technology further relates to a footrest for a tricycle, wherein the crank receiver comprises a first crank receiver for engaging a first crank for a first pedal of the tricycle, and a second crank receiver for engaging a second crank for a second pedal of the tricycle.

The disclosed subject technology further relates to a footrest for a tricycle, wherein the fork receiver comprises a first fork receiver for engaging a first portion of the fork, and a second fork receiver for engaging a second portion of the fork.

The disclosed subject technology further relates to a footrest for a tricycle, wherein the tricycle has a tricycle body extending distal the fork and a pair of rear wheels rotatably connected to the tricycle body, and wherein the footrest does not engage the tricycle body.

The disclosed subject technology further relates to a footrest for a tricycle, wherein the tricycle has a tricycle body extending distal the fork and a pair of rear wheels rotatably connected to the tricycle body, and wherein the opening of the U-shaped configuration of the foot platform faces away from tricycle body.

The disclosed subject technology further relates to a footrest for a tricycle, wherein the foot platform has a U-shaped configuration with an opening to receive a front wheel of the tricycle, wherein the housing further comprises a raised sidewall extending from the foot platform, the raised sidewall extending around a portion of a perimeter of the opening in a U-shaped configuration, the raised sidewall having an inner surface and an outer surface, and wherein the opening of the U-shaped configuration of the foot platform faces away from tricycle body.

The disclosed subject technology further relates to a footrest for a tricycle, wherein the retaining assembly is adapted to be separately secured to the lower portion of the fork of the tricycle, the crank of the tricycle, and one of the fender for the front wheel of the tricycle and the upper portion of the fork of the tricycle.

The disclosed subject technology further relates to a footrest for a tricycle, wherein the retaining assembly comprises a connection member for engaging the fender or the upper portion of the fork, a fork receiver for engaging the lower portion of the fork, and a crank receiver for engaging the crank.

The disclosed subject technology further relates to a footrest for a tricycle, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

The disclosed subject technology further relates to a footrest for a tricycle, wherein the foot platform has a U-shaped configuration with an opening to receive a front wheel of the tricycle, wherein the housing further comprises a raised sidewall extending from the foot platform, the raised sidewall extending around a portion of a perimeter of the opening in a U-shaped configuration, the raised sidewall having an inner surface and an outer surface, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 2 is a side view of the tricycle and footrest of FIG. 1 with the footrest removed, and displaying one step in securing the footrest to the tricycle.

FIG. 3 is a side view of the tricycle and footrest of FIG. 1, and displaying a subsequent step in securing the footrest to the tricycle.

Figure 1:
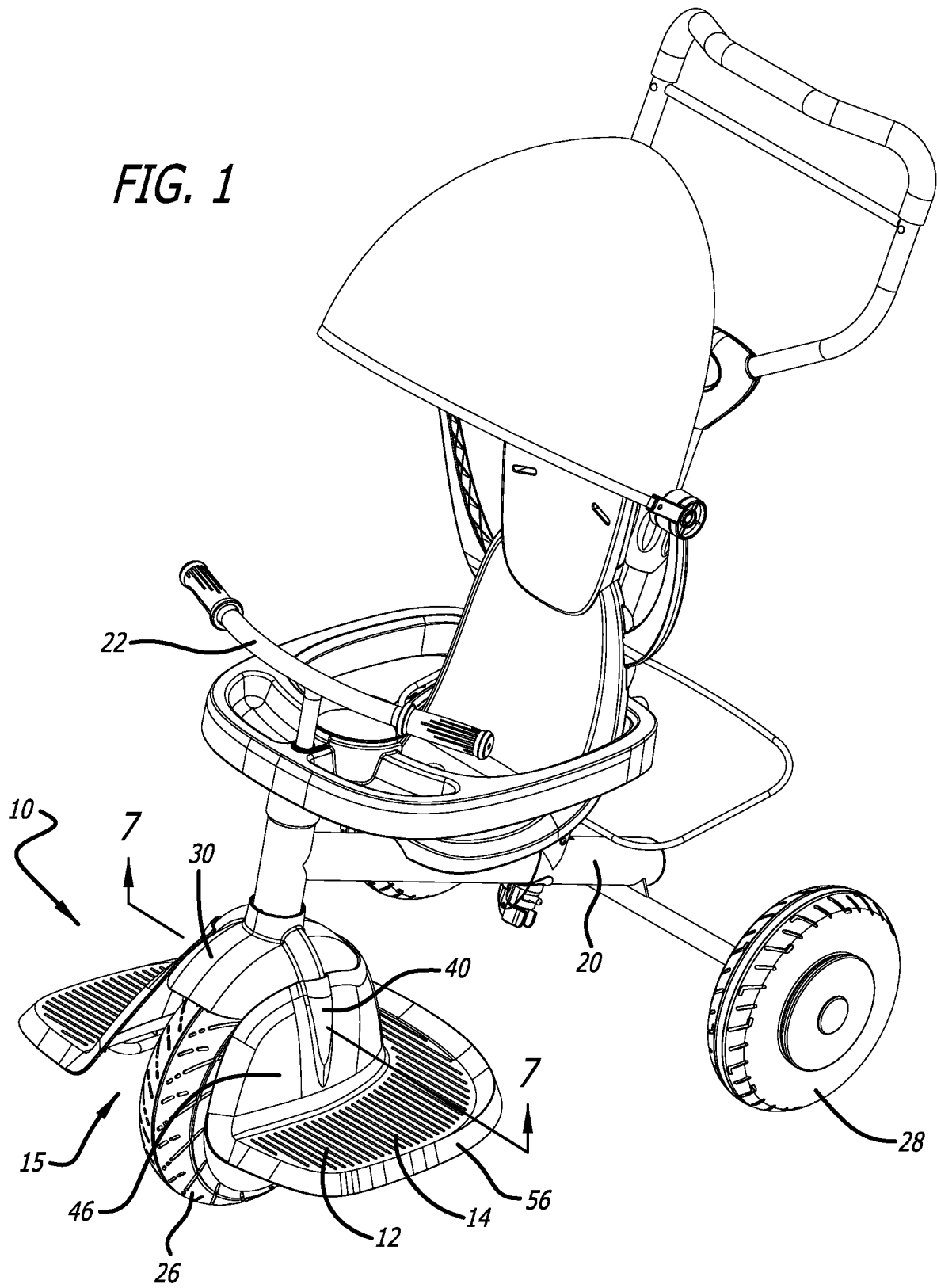
FIG. 1 is a front perspective view of a tricycle having a footrest in the use position according to an implementation of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While the footrest discussed herein is susceptible of implementations in many different forms, there is shown in the drawings, and will herein be described in detail, implementations with the understanding that the present description is to be considered as an exemplification of the principles of the scooter and is not intended to limit the broad aspects of the disclosure to the implementations illustrated. Thus, the detailed description set forth below is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Referring now to the figures, and initially to FIGS. 1-7, there is shown a footrest 10 according to one embodiment. The footrest 10 is preferably connectable to a tricycle, such as the tricycle shown in FIGS. 1 and 4, and in one embodiment is removable from the tricycle, such as shown in FIGS. 2 and 3. In various implementations, the footrest 10 comprises a housing 12 made of a foot platform 14 and a retaining assembly 16. In a preferred embodiment the foot platform 14 and a portion of the retaining assembly 16 are integral.

For reference, as shown in FIG. 1, a tricycle typically comprises a tricycle body 20, a handlebar 22 connected to a fork 24 that is rotatably secured to the tricycle body 20, the fork 24 supporting a front wheel 26, and the tricycle body 20 further supporting first and second rear wheels 28. Thus, the tricycle body extends distal the fork and the pair of rear wheels are connected adjacent the opposite end of the tricycle body. The tricycle may also have a front fender 30. Typically, the tricycle also has a crank 32 and two pedals 34, wherein the crank 32 is secured to the front wheel 26 and the fork 24 such that rotation of the crank 32 operates to rotate the front wheel 26. Therefore, when a user pushes on the pedals 34 to rotate the crank 32, the front wheel 26 will similarly rotate.

Figure 5:
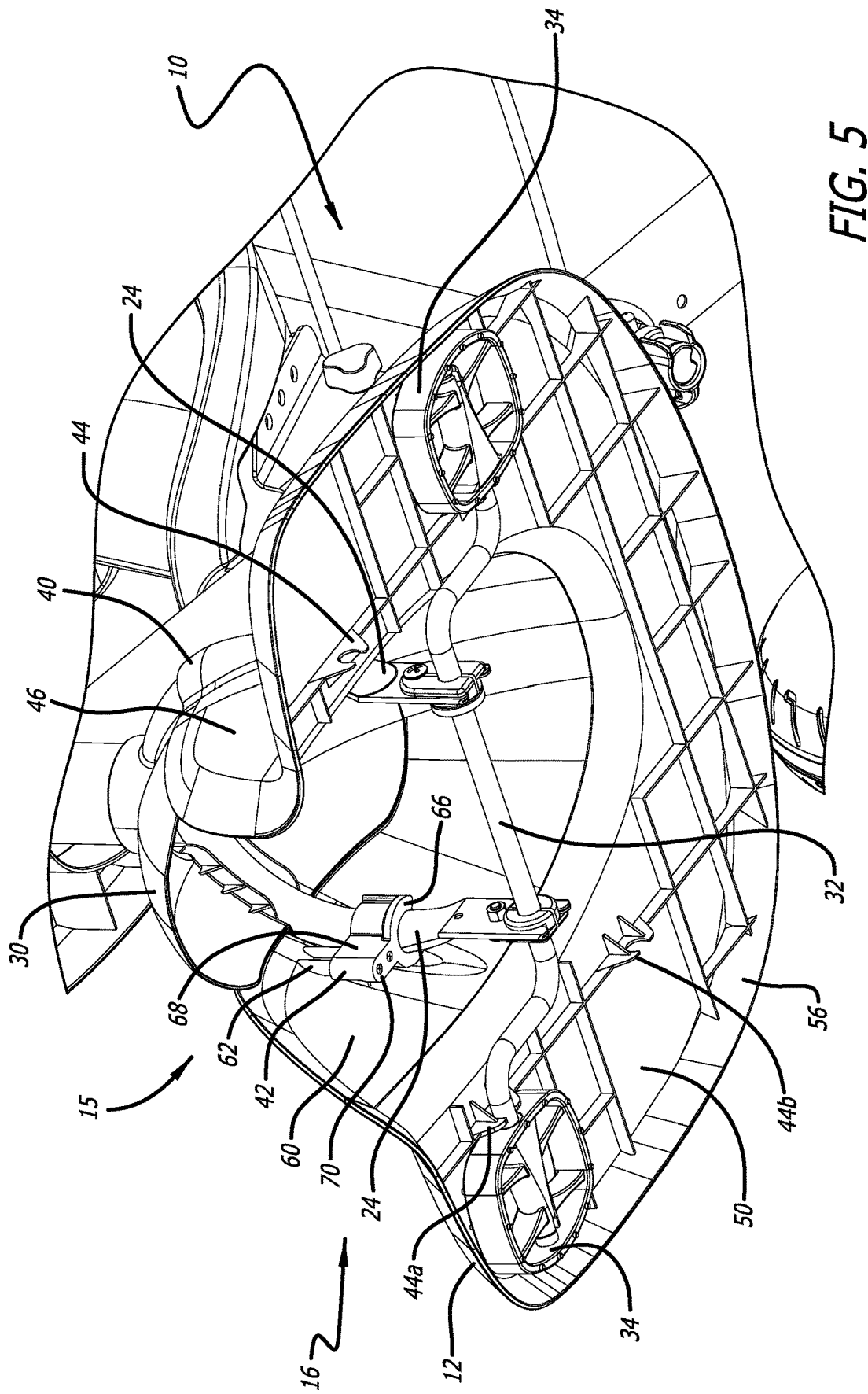
FIG. 5 is a bottom perspective view of one embodiment of a footrest secured to a tricycle with the front wheel removed to provide better viewing of the connection of the footrest to the tricycle, according to an implementation of the present disclosure.
Figure 6:
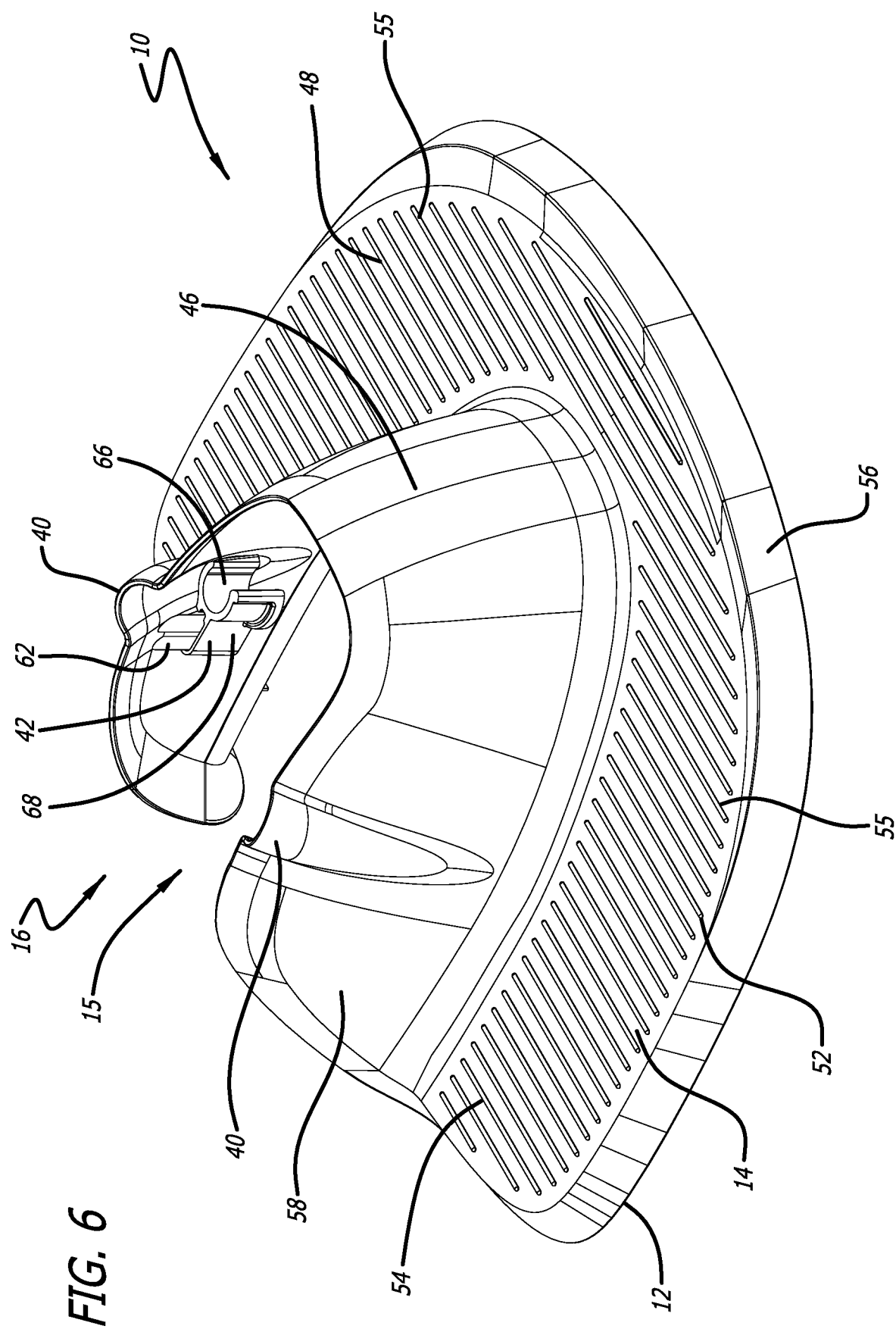
FIG. 6 is a top rear perspective view of a footrest for a tricycle according to an implementation of the present disclosure.
Figure 7:
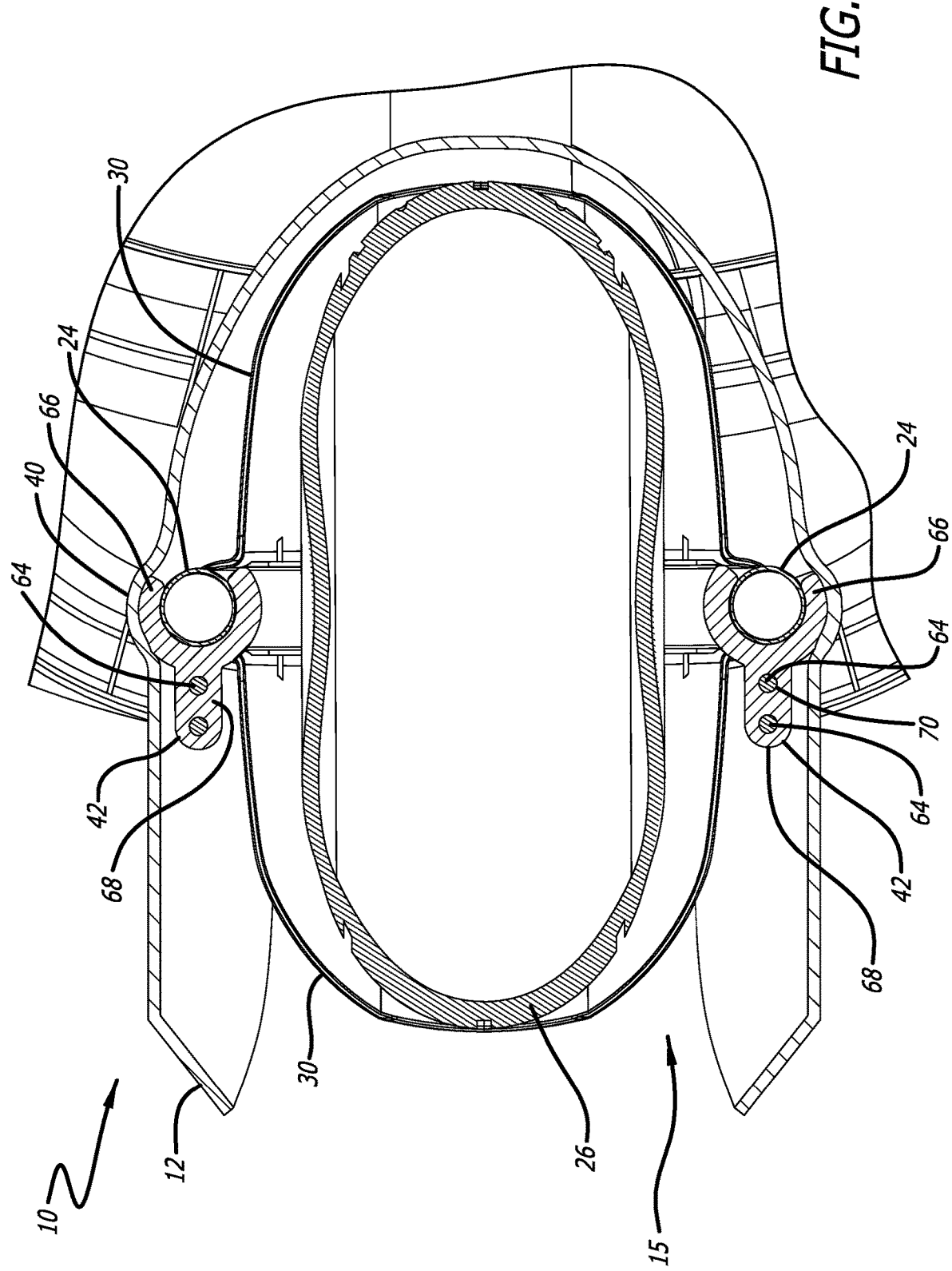
FIG. 7 is a partial cross-sectional view of the footrest of FIG. 1 about line 7-7 of FIG. 1.

The retaining assembly 16 assists in securing, and preferably removably securing the footrest 10 to the tricycle. As shown in FIGS. 5-7, the retaining assembly 16 comprises one or more of the following connection components 38: one or more of a snap fit or press fit connection members 40, one or more fork receivers 42 and one or more crank receivers 44. The retaining assembly 16 is adapted to be separately secured to a lower portion of a fork 24 of the tricycle, a crank 32 of the tricycle, and one of a fender 30 for the front wheel 26 of the tricycle and an upper portion of the fork 24. The snap fit or press fit connection members 18 preferably removably secure the footrest 10 to either the tricycle fender 30 or the upper portion of the fork 24. The fork receivers 42 preferably removably secure the footrest 10 to the lower portion of the fork 24, and the crank receivers 44 preferably removably secure the crank 32 to the footrest 10. In one embodiment all three types of connection components 38 may be employed, however, in alternate embodiments not all of the various connection components 38 may be provided and/or utilized. For example, in one alternate embodiment only snap fit or press fit connection members 40 may be provided, and no fork receivers 42 or crank receivers 44 may be provided. In another alternate embodiment only fork receivers 42 may be provided, and no snap fit or press fit connection members 40 and no crank receivers 44 may be provided. In another alternate embodiment only crank receivers 44 may be provided, and no snap fit or press fit connection members 40 and no fork receivers 42 may be provided. In another alternate embodiment only snap fit or press fit connection members 40 and fork receivers 42 may be provided, but no crank receivers 44 may be provided. In another alternate embodiment only snap fit or press fit connection members 40 and crank receivers 44 may be provided, but no fork receivers 42 may be provided. Finally, in another alternate embodiment only fork receivers 42 and crank receivers 44 may be provided, but no snap fit or press fit connection members 40 may be provided. Further, it is understood that while two snap fit or press fit connection members 40 are shown in the figures, only one snap fit or press fit connection members 40 may be provided. Similarly, while two fork receivers 42 are shown only one fork receiver may be provided. And, while a plurality of crank receivers 44 are shown only one crank receiver may be provided.

In one embodiment, the housing 12 of the footrest 10 also has a raised sidewall 46 extending from the foot platform 14. In a preferred embodiment the foot platform 14 has a U-shaped configuration with an opening 15. The opening 15 is adapted to receive the front wheel 26 of a tricycle. The U-shaped configuration allows a user's foot to be placed on each side of the front wheel 26 of the tricycle, respectively, as well as directly behind the front wheel 26, therefore providing increased protection so that a user's foot does not become engaged with the front wheel 26 during use. The raised sidewall 46 extends around a portion of the perimeter of the opening 15 in a U-shaped configuration.

The foot platform 14 preferably has an outer or top surface 48, an inner or bottom surface 50, an outer portion 52 and an inner portion 54. The top surface 48 is adapted to receive the foot of a user. Ridges 55 or other non-skid surface components may be provided on the top surface 48 of the foot platform 14 to help prevent sliding of a user's foot when engaged with the foot platform 14. A skirt 56 may be provided at the outer portion 52 of the foot platform 14 as shown in FIGS. 5 and 6. The raised sidewall 46 preferably extends from the inner portion 54 of the foot platform 14 and outwardly away from the top surface 48 of the foot platform 14. In a preferred embodiment, the raised sidewall 46 similarly has a U-shaped configuration like the foot platform 14 and similarly has the opening 15 to the housing 12, however, in alternate embodiments the raised sidewall 46 may be alternate shapes and configurations. The raised sidewall 46 also preferably has an outer surface 58 and an inner surface 60.

Referring to FIGS. 5 and 6, in one embodiment the snap fit or press fit connection members 40 of the connection components 38 are provided in the sidewall 46 of the housing 12, and preferably on the inner surface 60 of the sidewall 46 of the housing 12. Accordingly, in one embodiment the snap fit or press fit connection members 40 are integral with the sidewall 46 of the housing 12. The snap fit or press fit connection members 40 comprise receivers that mate with and engage with either protrusions on the tricycle fender 30 or the tricycle fork 24. In one embodiment, as shown in FIGS. 1, 5 and 7, when the footrest 10 is connected to the tricycle the connection members 40 engage the protrusions in the tricycle fender 30 is a snap fit or clamping manner to seat and at least partially retain the footrest 10 on the tricycle.

As shown in FIGS. 5 and 6, in one embodiment receiving bosses 62 are provided on the inner surface 60 of the raised sidewall 46 for connecting the fork receivers 42 to the housing 12. The receiving bosses 62 have fastener receivers so that fasteners 64 can be used to secure the fork receivers 42 to the receiving bosses 62. The receiving bosses 62 also have a geometry to receive and mate with a portion of the fork receivers 42.

In one embodiment, the fork receivers 42 comprise a clamp member 66, such as a C-shaped clamp member 66, and a mating portion 68. The mating portion 68 of the fork receivers 42 is the portion that mates with the receiving bosses 62 of the housing 12. The mating portion 68 also has through holes 70 so that fasteners 64 can be used to secure the fork receivers 42 to the receiving bosses 62. The clamp member 66 of the fork receivers 42 is used to clamp the fork receivers 42 to the fork 24 of the tricycle, preferably in a snap fit but removable manner as shown in FIG. 5. In various embodiments, the fork receivers 42 extend from one of the bottom surface of the foot platform or an inner surface of the raised sidewall. In one embodiment, the fork receiver comprises a first fork receiver for engaging a first portion of the fork, and a second fork receiver for engaging a second portion of the fork.

Referring to FIG. 5, the housing 12 preferably also has crank receivers 44 positioned on the inner or bottom surface 50 of the foot platform 14. In a preferred embodiment the crank receivers 44 comprise a snap fit clamping member 44 that is adapted to removably secure the crank 32 of the tricycle to the housing 12. In a preferred embodiment the housing 12 has crank receivers 44 positioned on each side of the opening 15 of the housing 12. Further, in a most preferred embodiment, the housing 12 has two crank receivers 44a and 44b positioned on each side of the opening 15 of the housing 12 so that regardless of the rotational position of the crank 32, the crank 32 can be secured to the crank receivers 44 with minimal rotation of the crank 32. In one embodiment, the crank receiver comprises a first crank receiver for engaging a first crank for a first pedal of the tricycle, and a second crank receiver for engaging a second crank for a second pedal of the tricycle.

Figure 4:
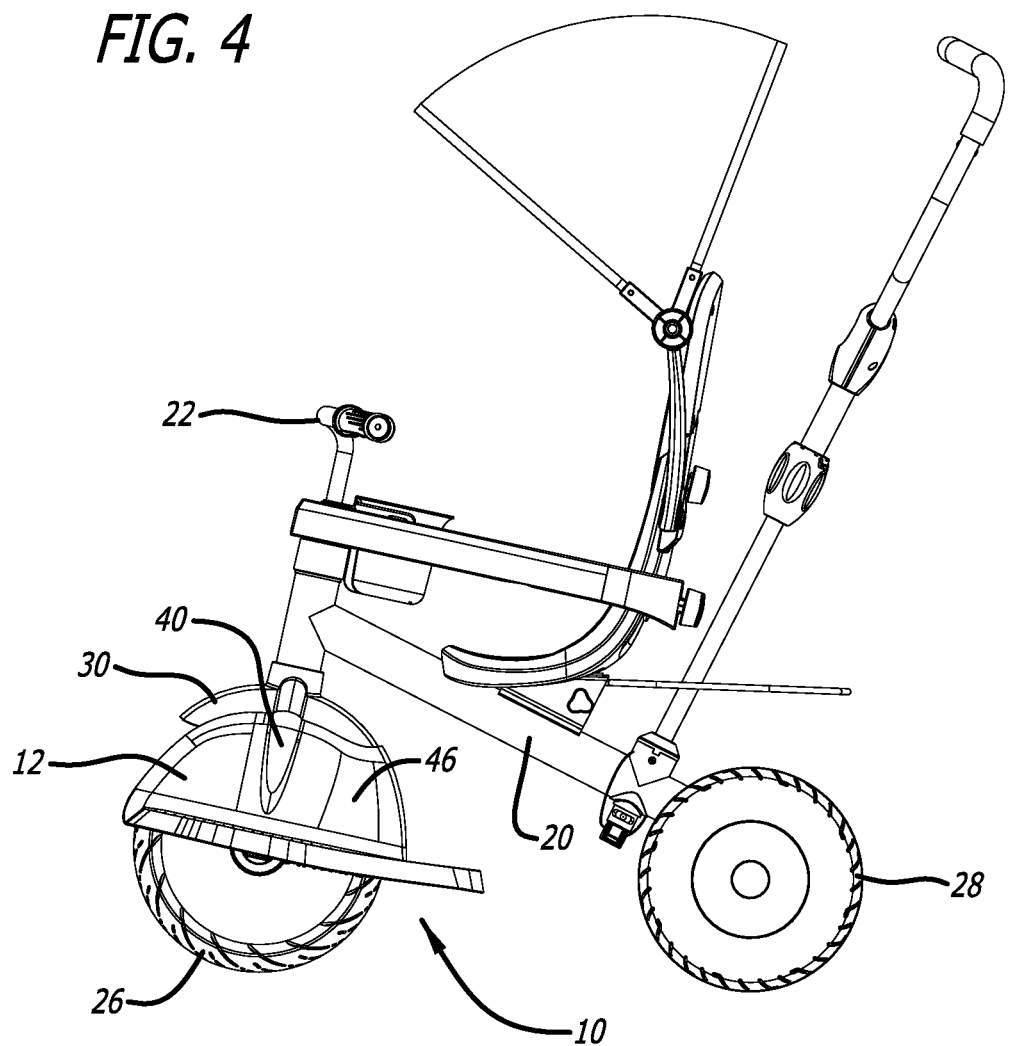
FIG. 4 is a side view of the tricycle and footrest of FIG. 1, displaying the footrest secured to the tricycle in the use position.

As explained above, the footrest 10 can be secured to the tricycle and removed from the tricycle as desired by the user. In a preferred embodiment the footrest does not engage the tricycle body. To secure the footrest 10 to the tricycle the user typically inserts the footrest 10 behind the front wheel 26, with the bottom surface 50 of the foot platform 14 facing the ground and with the opening 15 facing the front wheel 26, as shown in FIG. 2. Further, the opening of the U-shaped configuration of the foot platform faces away from the tricycle body. The user then moves the footrest 10 toward the front wheel 26, and preferably toward the fender 30 and/or fork 24 of the tricycle. As the footrest 10 with the opening 15 facing the front wheel 26 is moved toward the fender 30 and/or fork 24, as shown in FIG. 3, the inner surface 60 of the sidewall 46 will engage the fender 30 and/or fork 24 and the sidewall 46 will flex outwardly as necessary until the snap fit or press fit connection members 40 of the connection components 38 mate with and engage with either protrusions on the tricycle fender 30 or the tricycle fork 24. Once the connection members 40 are properly seated in a clamping manner on the protrusions of the tricycle fender 30 or the tricycle fork 24, the sidewalls 46 will flex back to retain the footrest 10 to the protrusions of the tricycle fender 30 or the tricycle fork 24, as shown in FIG. 4, depending on the configuration of the tricycle.

As the connection members 40 are being seated on the protrusions of the tricycle fender 30 or the tricycle fork 24, the fork receivers 42 will be engaging the fork 24 of the tricycle as shown in FIGS. 5 and 7. Specifically, the C-shaped clamp members 66 of the fork receivers 42 will engage, in a clamping manner, the fork 24 of the tricycle to further secure the footrest 10 to the tricycle. Finally, to seat the crank 32 of the tricycle to the footrest 10 the crank 32 is snap fit into the appropriate crank receivers 44 on the bottom surface 50 of the foot platform 14. At this point the footrest 10 will be properly connected to the tricycle.

To remove the footrest 10 from the tricycle the crank 32 is removed from the crank receivers 44 and then the footrest 10 is pulled rear and away from the front wheel 26, removing the fork 24 from the fork receivers 42 and disengaging the connection members 40 from the protrusions of the tricycle fender 30 or the tricycle fork 24 if no fender is provided.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A footrest for a tricycle, comprising:
a housing having a foot platform having a top surface and a bottom surface, the top surface adapted to receive a foot of the user, the foot platform having a U-shaped configuration with an opening to receive a front wheel of the tricycle, a raised sidewall extending from the foot platform, the raised sidewall extending around a portion of a perimeter of the opening in a U-shaped configuration, the raised sidewall having an inner surface and an outer surface, and a retaining assembly, wherein the retaining assembly is adapted to be separately secured to a lower portion of a fork of the tricycle, a crank of the tricycle, and one of a fender for the front wheel of the tricycle and an upper portion of the fork.

2. The footrest of claim 1, wherein the retaining assembly comprises a connection member for engaging the fender or the upper portion of the fork, a fork receiver for engaging the lower portion of the fork, and a crank receiver for engaging the crank, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

3. The footrest of claim 2, wherein the crank receiver comprises a first crank receiver for engaging a first crank for a first pedal of the tricycle, and a second crank receiver for engaging a second crank for a second pedal of the tricycle.

4. The footrest of claim 2, wherein the fork receiver comprises a first fork receiver for engaging a first portion of the fork, and a second fork receiver for engaging a second portion of the fork.

5. The footrest of claim 1, wherein the tricycle has a tricycle body extending distal the fork and a pair of rear wheels rotatably connected to the tricycle body, and wherein the footrest does not engage the tricycle body when the footrest is secured to the tricycle.

6. The footrest of claim 1, wherein the tricycle has a tricycle body extending distal the fork and a pair of rear wheels rotatably connected to the tricycle body, and wherein the opening of the U-shaped configuration of the foot platform faces away from tricycle body.

7. A footrest for a tricycle, the tricycle having a fork rotatably securing a front wheel, a tricycle body extending distal the fork, and a pair of rear wheels rotatably connected to the tricycle body, the footrest comprising:
a housing having a foot platform and a retaining assembly, the foot platform having a top surface and a bottom surface, the top surface adapted to receive a foot of the user, wherein the retaining assembly is adapted to separately be secured to at least two of (a) a lower portion of the fork of the tricycle, (b) a fender for the front wheel of the tricycle or an upper portion of the fork of the tricycle, and (c) a crank of the tricycle.

8. The footrest of claim 7, wherein the foot platform has a U-shaped configuration with an opening to receive the front wheel of the tricycle, and a raised sidewall extending from the foot platform, the raised sidewall extending around a portion of a perimeter of the opening in a U-shaped configuration, the raised sidewall having an inner surface and an outer surface.

9. The footrest of claim 7, wherein the footrest does not engage the tricycle body.

10. The footrest of claim 7, wherein the retaining assembly is adapted to be separately secured to the lower portion of the fork of the tricycle, the crank of the tricycle, and one of the fender for the front wheel of the tricycle and the upper portion of the fork of the tricycle.

11. The footrest of claim 7, wherein the retaining assembly comprises a connection member for engaging the fender or the upper portion of the fork, a fork receiver for engaging the lower portion of the fork, and a crank receiver for engaging the crank.

12. The footrest of claim 11, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

13. The footrest of claim 11, wherein the crank receiver comprises a first crank receiver for engaging a first crank for a first pedal of the tricycle, and a second crank receiver for engaging a second crank for a second pedal of the tricycle.

14. The footrest of claim 11, wherein the fork receiver comprises a first fork receiver for engaging a first portion of the fork, and a second fork receiver for engaging a second portion of the fork.

15. The footrest of claim 11, wherein the tricycle has a tricycle body extending distal the fork and a pair of rear wheels rotatably connected to the tricycle body, and wherein the footrest does not engage the tricycle body when the footrest is secured to the tricycle.

16. A footrest for a tricycle, the tricycle having a fork rotatably securing a front wheel, a tricycle body extending distal the fork, and a pair of rear wheels rotatably connected to the tricycle body, the footrest comprising:
a housing having a foot platform and a retaining assembly, the foot platform having a top surface and a bottom surface, the top surface adapted to receive a foot of the user, wherein the retaining assembly is adapted to separately engage one of the fork of the tricycle, a fender for the front wheel of the tricycle, and a crank of the tricycle, and wherein the footrest is not secured to the tricycle body when the footrest is secured to the tricycle.

17. The footrest of claim 16, wherein the foot platform has a U-shaped configuration with an opening to receive a front wheel of the tricycle, wherein the housing further comprises a raised sidewall extending from the foot platform, the raised sidewall extending around a portion of a perimeter of the opening in a U-shaped configuration, the raised sidewall having an inner surface and an outer surface, and wherein the opening of the U-shaped configuration of the foot platform faces away from tricycle body.

18. The footrest of claim 16, wherein the retaining assembly comprises a fork receiver for engaging a lower portion of the fork, and a crank receiver for engaging the crank.

19. The footrest of claim 18, wherein the retaining assembly further comprises a connection member for engaging the fender or an upper portion of the fork.

20. The footrest of claim 19, wherein the foot platform has a U-shaped configuration with an opening to receive a front wheel of the tricycle, wherein the housing further comprises a raised sidewall extending from the foot platform, the raised sidewall extending around a portion of a perimeter of the opening in a U-shaped configuration, the raised sidewall having an inner surface and an outer surface, wherein the connection member is on the inner surface of the raised sidewall, wherein the fork receiver extends from one of a bottom surface of the foot platform and an inner surface of the raised sidewall, and wherein the crank receiver extends from a bottom surface of the foot platform.

\* \* \* \* \*